(12) United States Patent
Lim et al.

(10) Patent No.: US 11,784,379 B2
(45) Date of Patent: Oct. 10, 2023

(54) BUTTON CELL

(71) Applicant: SAMSUNG SDI CO., LTD., Yongin-si (KR)

(72) Inventors: Daeseop Lim, Yongin-si (KR); Ha-Dong Kim, Yongin-si (KR); Hyo-bin Bang, Yongin-si (KR); Yoojin Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 124 days.

(21) Appl. No.: 17/111,817

(22) Filed: Dec. 4, 2020

(65) Prior Publication Data
US 2021/0320386 A1    Oct. 14, 2021

(30) Foreign Application Priority Data
Apr. 13, 2020    (KR) ........................ 10-2020-0044714

(51) Int. Cl.
*H01M 50/559*    (2021.01)
*H01M 50/109*    (2021.01)
*H01M 50/531*    (2021.01)
*H01M 50/593*    (2021.01)
*H01M 50/597*    (2021.01)

(52) U.S. Cl.
CPC ....... *H01M 50/559* (2021.01); *H01M 50/109* (2021.01); *H01M 50/531* (2021.01); *H01M 50/593* (2021.01); *H01M 50/597* (2021.01); *H01M 2200/30* (2013.01)

(58) Field of Classification Search
CPC ............. H01M 50/559; H01M 50/109; H01M 50/531; H01M 50/597; H01M 50/593; H01M 2200/30
See application file for complete search history.

(56) References Cited

U.S. PATENT DOCUMENTS

| 9,153,835 | B2 | 10/2015 | Pytlik et al. |
| 9,178,251 | B2 | 11/2015 | Gaugler |
| 9,496,581 | B2 | 11/2016 | Pytlik et al. |
| 9,515,309 | B2 | 12/2016 | Yoon et al. |
| 9,799,858 | B2 | 10/2017 | Gaugler |
| 9,799,913 | B2 | 10/2017 | Pytlik et al. |

(Continued)

FOREIGN PATENT DOCUMENTS

| CN | 108682755 A | 10/2018 |
| CN | 208862037 U | 5/2019 |

(Continued)

OTHER PUBLICATIONS

EPO machine generated English translation of JP-2006313649-A (Year: 2006).*

(Continued)

*Primary Examiner* — Christopher P Domone
*Assistant Examiner* — Kimberly Wyluda
(74) *Attorney, Agent, or Firm* — Lewis Roca Rothgerber Christie LLP

(57) ABSTRACT

A rechargeable battery includes: a case accommodating an electrode assembly and having an opening; a cap assembly including a cap plate coupled to the case to cover the opening, and a terminal plate coupled to the cap plate; and a direction determining member covering the cap plate and coupled to the case to define an extended part.

18 Claims, 6 Drawing Sheets

(56) References Cited

U.S. PATENT DOCUMENTS

| | | | |
|---|---|---|---|
| 2008/0248384 A1 | 10/2008 | Yabushita et al. | |
| 2016/0043356 A1* | 2/2016 | Sunada | H01M 50/169 |
| | | | 429/179 |
| 2017/0207491 A1 | 7/2017 | Tamachi et al. | |

FOREIGN PATENT DOCUMENTS

| | | |
|---|---|---|
| DE | 3247191 A1 | 7/1983 |
| JP | 3685595 B2 | 8/2005 |
| JP | 2006313649 A * | 11/2006 |
| JP | 5505988 B2 | 5/2014 |
| JP | 2016-002816 A | 1/2016 |
| KR | 10-2008-0092842 A | 10/2008 |
| KR | 10-1023922 B1 | 3/2011 |
| WO | WO 2010/146154 A2 | 12/2010 |

OTHER PUBLICATIONS

Extended European Search Report for corresponding European Application No. 21157865.3, European Search Report dated Jul. 15, 2021 (7 pgs.).

* cited by examiner

BUTTON CELL

CROSS-REFERENCE TO RELATED APPLICATION

This application claims priority to and the benefit of Korean Patent Application No. 10-2020-0044714, filed on Apr. 13, 2020 in the Korean Intellectual Property Office, the entire content of which is incorporated herein by reference.

BACKGROUND

1. Field

Aspects of embodiments of the present invention relate to a rechargeable battery.

2. Description of the Related Art

Unlike a primary battery that is incapable of being recharged, a rechargeable battery can be repeatedly charged and discharged. A low-capacity rechargeable battery may be used for small electronic devices, such as a mobile phone, a laptop computer, and a camcorder, and a large-capacity battery has been widely used as a power source for driving a motor of a hybrid vehicle, for example.

A representative rechargeable battery includes a nickel-cadmium (Ni—Cd) battery, a nickel-hydrogen (Ni-MH) battery, a lithium (Li) battery, and a lithium ion (Li-ion) rechargeable battery. Particularly, the lithium ion secondary battery has a higher operation voltage by about three times than the nickel-cadmium battery or the nickel-hydrogen battery that may be used as a portable electric equipment power source. Also, the lithium ion secondary battery may be widely used in that energy density per unit weight is high.

In particular, as a demand for wearable devices, such as headphones, earphones, smart watches, and body-mounted medical devices which use Bluetooth, has increased, the demand for a rechargeable battery of which energy density is high and is ultra-small is increasing.

The ultra-small rechargeable battery has important tasks of providing required electrical capacity within a limited size, implementing an efficient structure while improving an effective low weight, and improving structural stability.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, an ultra-small rechargeable battery is provided. According to another aspect of embodiments of the present invention, a rechargeable battery configured to prevent or substantially prevent reverse direction insertion is provided.

According to another aspect of embodiments of the present invention, a rechargeable battery configured to prevent or substantially prevent an external short circuit of parts having different polarities in the cap assembly is provided.

A rechargeable battery according to one or more embodiments of the present invention includes: a case accommodating an electrode assembly and having an opening; a cap assembly including a cap plate coupled to the case to cover the opening, and a terminal plate coupled to the cap plate; and a direction determining member covering the cap plate and coupled to the case to define an extended part.

The electrode assembly may include a first electrode, a second electrode, and a separator therebetween, the case may be connected to the first electrode by a first electrode tab, and the terminal plate may be connected to the second electrode by a second electrode tab.

The cap plate may be electrically connected to the case, and the cap plate and the terminal plate may be thermally fused with a thermal fusion member therebetween and are electrically insulated from each other.

The terminal plate may include: a flange part between the cap plate and the electrode assembly and electrically insulated from and attached to an inner surface of the cap plate; and a protruded terminal protruded outside from the flange part to be inserted into a terminal hole of the cap plate and electrically connected to the second electrode tab via an inner surface of the terminal plate.

An outer surface of the protruded terminal and an outer surface of the cap plate may respectively define a plane surface separated from each other at a same height based on a bottom of the case.

The direction determining member may include: a plane portion including a through hole corresponding to the protruded terminal so as to cover the outer surface of the cap plate while exposing the protruded terminal; and a side portion extending along a side of the case on an outer surface of the plane portion so as to cover and be coupled to a part of the side of the case.

The direction determining member may include an electrically insulating material to electrically insulate between the outer surface of the protruded terminal and the outer surface of the cap plate.

The through hole of the direction determining member may be concentric with the terminal hole of the cap plate, and the diameter of the through hole may be smaller than the diameter of the terminal hole to thereby cover an entire outer surface of the cap plate at a side of the protruded terminal.

The direction determining member may include polypropylene (PP), polyethylene (PE), polyethylene terephthalate (PET), polyethylene naphthalate (PEN) resin, or rubber.

A diameter direction length D1 of the plane portion may be equal to or greater than a length H1 in a height direction of the side portion (D1≥H1).

The terminal plate may include: a flange part outside the cap plate and electrically insulated from and attached to the outer surface of the cap plate; and a tab connection portion protruded inside from the flange part to be inserted into the terminal hole of the cap plate and electrically connected to the second electrode tab via an inner surface of the terminal plate.

Based on the bottom of the case, the outer surface of the cap plate may be covered by the flange part, and a remaining exposed surface is defined as a plane surface.

The direction determining member may include: a plane portion including a through hole corresponding to the flange part so as to cover the exposed surface of the cap plate while exposing the flange part; and a side portion extending along a side of the case outside the plane portion so as to cover and be coupled to a part of the side of the case.

Based on the bottom of the case, a height of the plane portion may be equal to or less than a height of the flange part.

A diameter direction length D2 of the plane portion may be equal to or less than a length H2 in the height direction of the side portion (D2≤H2).

The rechargeable battery according to one or more embodiments of the present invention may further include an insulating member on an exterior circumference of the tab connection portion and installed to the inner surface of the cap plate.

The direction determining member may define a step on the side of the case by the extended part.

The case may define a first diameter in an outer surface in a diameter direction at the lower portion, and the direction determining member may be coupled to the upper portion of the case to define a second diameter that is larger than the first diameter in the diameter direction.

In the rechargeable battery according to one or more embodiments of the present invention, since the direction determining member covers the cap plate and is coupled to the case, the extended part may be formed. The extended part forms the step at the side of the case. That is, since the direction determining member is more protruded than the side of the case at the cap plate and its adjacent side, the step may be formed with the extended part that has an increased height or diameter. Therefore, visually or structurally, a reverse direction insertion of the rechargeable battery may be effectively prevented.

In the rechargeable battery according to one or more embodiments, two parts of the cap assembly having different polarities (e.g., the cap plate and the terminal plate) are exposed in the same direction, and the direction determining member may cover at least one of two parts having different polarities. When the direction determining member is formed of an electrically insulating material, a short circuit of two parts by a conductive foreign material may be effectively prevented.

In the rechargeable battery of one or more embodiments, the extended part is formed of the direction determining member coupled to the case, and the extended part may buffer against physical impact, thereby improving safety, such as in a drop test and a tumbling test.

DESCRIPTION OF REFERENCE DESIGNATORS

Figure 1:
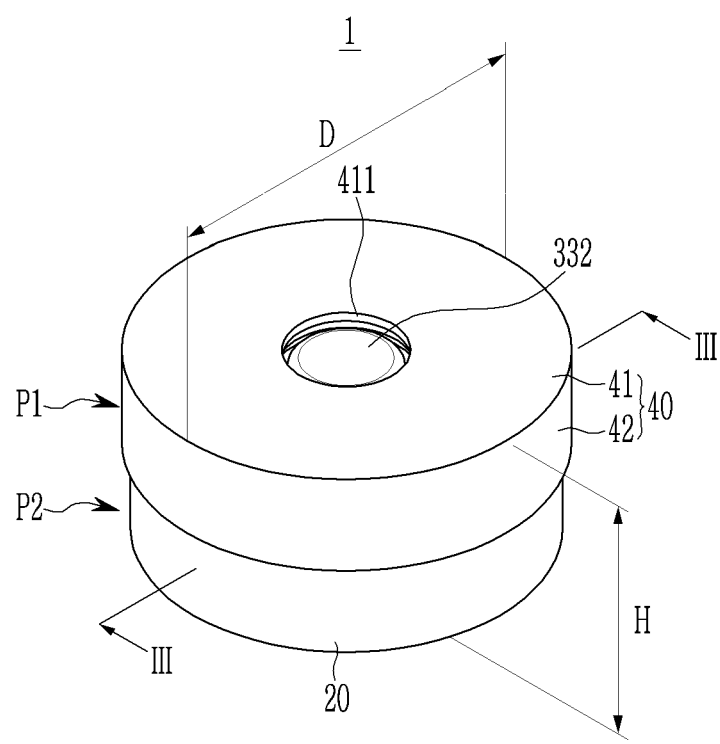
FIG. 1 is a perspective view showing a rechargeable battery according to an embodiment of the present invention.

| | |
|---|---|
| 1, 2: rechargeable battery | 10: electrode assembly |
| 11: first electrode | 12: second electrode |
| 13: separator | 14: insulating sheet |
| 20: case | 21: opening |
| 30, 60: cap assembly | 31: cap plate |
| 33, 63: terminal plate | 34: thermal fusion member |
| 40, 70: direction determining member | 41, 71: plane portion |
| 42, 72: side portion | 51: first electrode tab |
| 52: second electrode tab | 61, 62: insulating member |
| 101: first end | 102: second end |
| 301: exposed surface | 311: terminal hole |
| 331, 631: flange part | 332: protruded terminal |
| 341: through hole | 411, 711: through hole |
| 611, 621: through hole | 632: tab connection portion |
| D: battery diameter | D1, D2: diameter direction length |
| D3: first diameter | H: height |
| H1, H2: length of height direction | P1, P3: extended part |
| P2, P4: non-extended part | ΔH: height difference |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Also, in this specification, it is to be understood that when one component is referred to as being "connected" or "coupled" to another component, it may be connected or coupled directly to the other component or connected or coupled to another component with one or more other components intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only for the purpose of describing particular embodiments, and is not intended to be limiting of the invention.

Singular forms are to include plural forms unless the context clearly indicates otherwise.

It is to be further understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

A rechargeable battery according to an embodiment of the present invention, which is an ultra-compact battery, may be a coin cell or a button cell. Here, the coin cell or the button cell is a thin coin-type or button-type cell, and refers to a battery having a ratio (H/D) of a height (H) to a diameter (D) (see FIG. 1) of 1 or less.

In an embodiment, the coin cell or the button cell is cylindrical, and a horizontal cross-section is circular, but the present invention is not limited thereto, and a horizontal cross-section may be oval or polygonal. In this case, a diameter is set to a maximum distance of a case (or a direction determining member) outer circumference based on a horizontal direction of a battery, and a height is set to a minimum distance between a case of a battery and an outer plane of a cap plate (or a direction determining member).

However, the present invention is not limited to the coin cell or the button cell that are provided as examples of the present invention, and a battery of the present invention may be a cylindrical-type or pin-type battery. Herein, a case in which a rechargeable battery according to an embodiment of the present invention is a coin cell or a button cell will be described in further detail.

Figure 2:
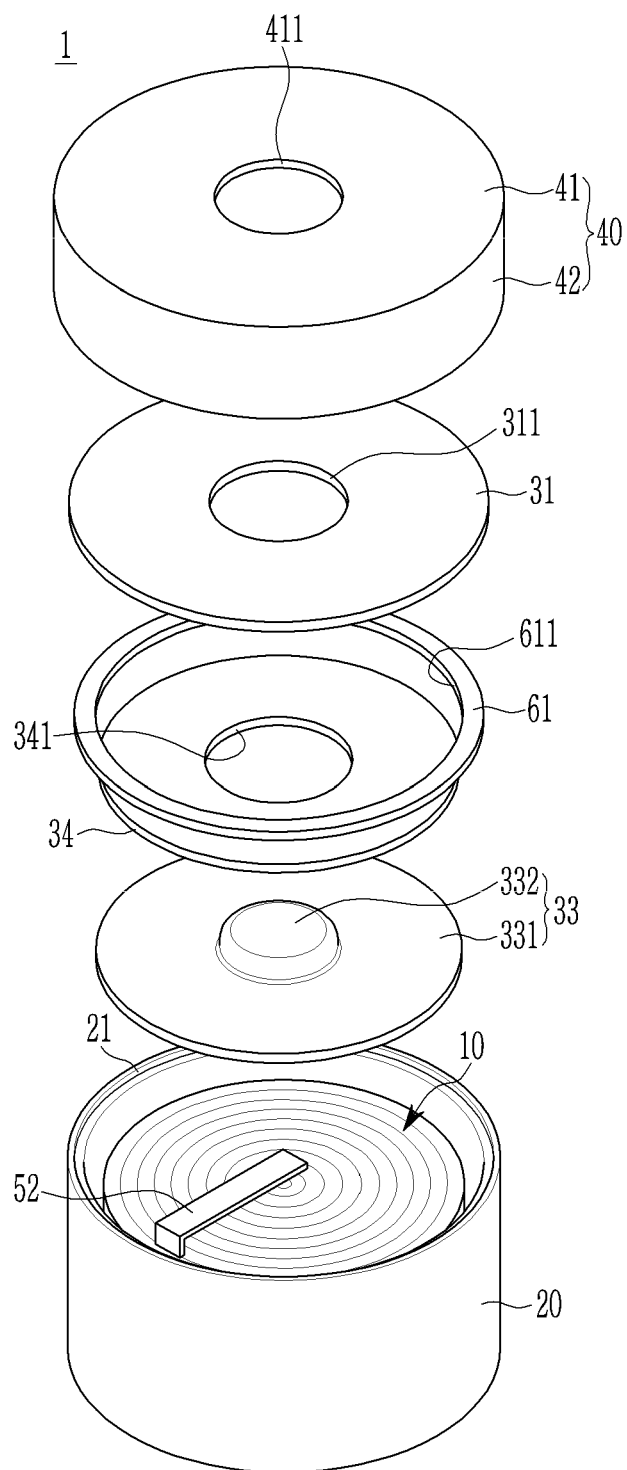
FIG. 2 is an exploded perspective view of the rechargeable battery of FIG. 1.

FIG. 1 is a perspective view showing a rechargeable battery according to a embodiment of the present invention; FIG. 2 is an exploded perspective view of the rechargeable battery of FIG. 1; and FIG. 3 is a cross-sectional view taken along the line III-III of FIG. 1.

Figure 3:
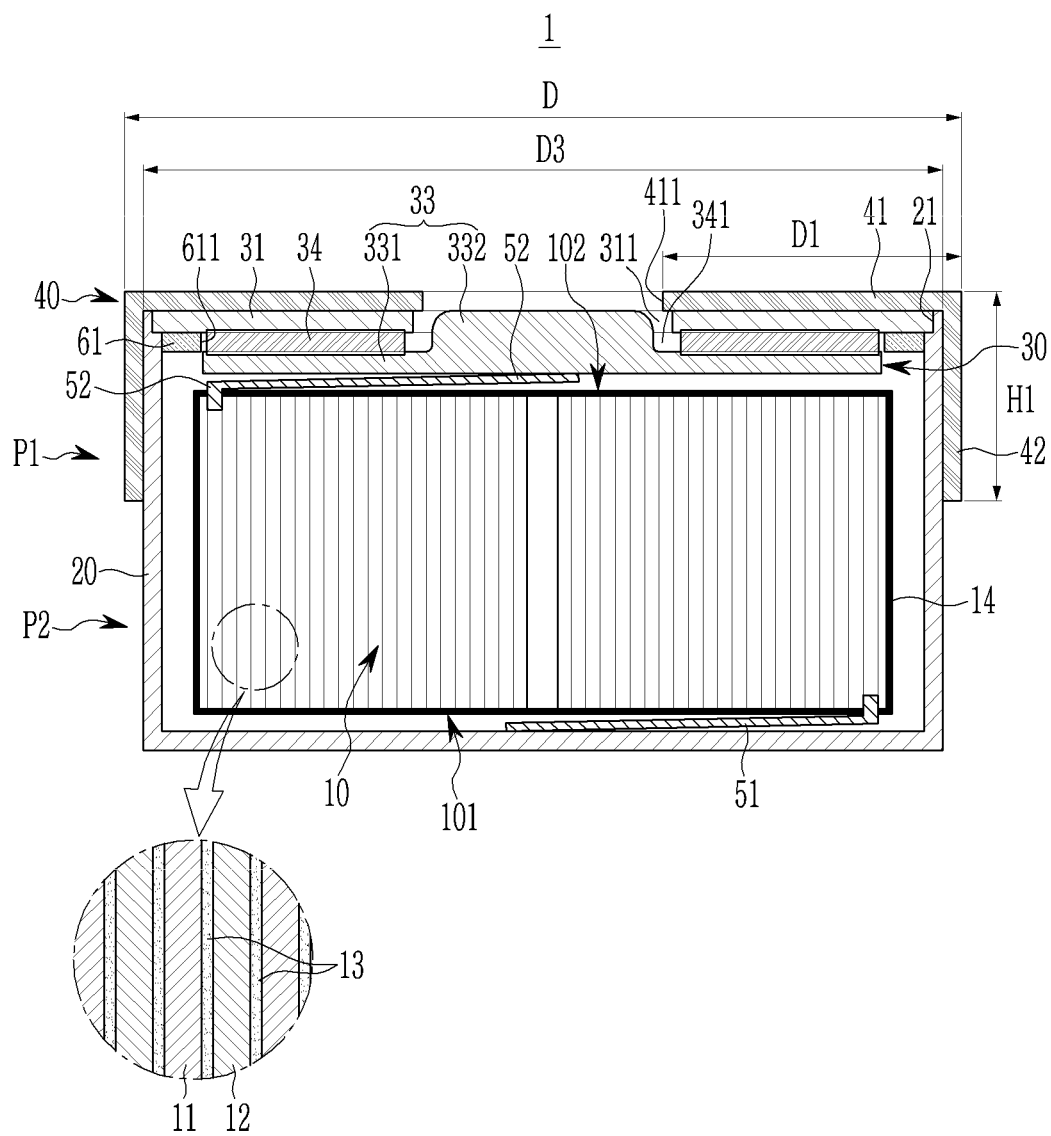
FIG. 3 is a cross-sectional view taken along the line III-III of FIG. 1.

Referring to FIG. 1 to FIG. 3, a rechargeable battery 1 according to an embodiment includes an electrode assembly 10, a case 20, a cap assembly 30, and a direction determining member 40. The cap assembly 30 includes a cap plate 31 and a terminal plate 33 coupled to each other. As an example, the cap plate 31 and the terminal plate 33 are thermally fused by a thermal fusion member 34 that is disposed therebetween.

In an embodiment, the thermal fusion member 34 acts as a medium to interconnect the cap plate 31 and the terminal plate 33. For example, the thermal fusion member 34 may be formed of an electrically insulating material, such as a polymer, and may be melted using a laser or the like to be fused to the cap plate 31 and the terminal plate 33.

In an embodiment, by coupling the terminal plate 33 to the cap plate 31 with the thermal fusion member 34, it is possible to form a stable coupling structure while effectively insulating between the terminal plate 33 and the cap plate 31 without adding a separate insulating configuration.

Since a coin cell is manufactured in an ultra-compact size, it may have a design limitation in terms of space, and, accordingly, it is desired to secure functionality while simplifying a structure and a manufacturing process thereof. Regarding this, in an embodiment, insulation and coupling between the terminal plate 33 and the cap plate 31 through the heat-fusion member 34 may be realized.

In an embodiment, the electrode assembly 10 includes a first electrode 11 (for example, a negative electrode) and a second electrode 12 (for example, a positive electrode) provided at respective sides of a separator 13 that is an electrical insulating material, and is formed by winding the first electrode 11, the separator 13, and the second electrode 12. Therefore, the electrode assembly 10 may be formed as a jelly roll type. In another embodiment, although not shown separately, the electrode assembly may be formed as a stack type.

The electrode assembly 10 is configured to charge and discharge a current, and a winding axis in the electrode assembly 10 may be arranged parallel to a height direction (a vertical direction in FIGS. 1 to 3) of the case 20. In an embodiment, a first end (a lower surface or cross-section of the electrode assembly) 101 and a second end (an upper surface or cross-section of the electrode assembly) 102 of the electrode assembly 10 may be flat and parallel to each other. In an embodiment, the electrode assembly 10 is not provided with a center pin, but a center pin (not shown) may be provided at a position of the winding axis.

The case 20 accommodates the electrode assembly 10 while facing the first end 101 of the electrode assembly 10. In an embodiment, the electrode assembly 10 is covered with an insulating sheet 14 and accommodated in the case 20. As an example, the case 20 is formed as a cylinder that accommodates the jelly roll type of electrode assembly 10, and the cap assembly 30 seals an opening 21 of the cylindrical case 20.

In an embodiment, the electrode assembly 10 includes a first electrode tab 51 connected to the first electrode 11 and a second electrode tab 52 connected to the second electrode 12, and the first and second electrodes 11 and 12 are drawn out to the first and second ends 101 and 102, respectively.

In a state in which the electrode assembly 10 is accommodated in the case 20, the first electrode tab 51 is electrically connected to a bottom of the case 20, and the second electrode tab 52 is electrically connected to the terminal plate 33 of the cap assembly 30.

In addition, the cap plate 31 of the cap assembly 30, while facing the second end 102 of the electrode assembly 10, is coupled to the case 20 to cover the opening 21. The terminal plate 33 is coupled to the second electrode tab 52 while being coupled to the cap plate 31 with the thermal fusion member 34.

Herein, a case in which the first electrode 11 and the second electrode 12 are respectively a negative electrode and a positive electrode will be described as an example, but the present invention is not limited thereto, and the first electrode 11 and the second electrode 12 may respectively be a positive electrode and a negative electrode.

The first electrode 11 is formed in a long extending strip shape, and includes a negative electrode coated portion that is a region in which a negative electrode active material layer is coated to a current collector of a metal foil (for example, a Cu foil) and a negative electrode uncoated portion that is a region in which an active material is not coated. The negative electrode uncoated portion may be disposed at an end portion in a length direction of the negative electrode.

The second electrode 12 is formed in a long extending strip shape, and includes a positive electrode coated portion that is a region in which a positive electrode active material layer is coated to a current collector of a metal foil (for example, an Al foil) and a positive electrode uncoated portion that is a region in which an active material is not coated. The positive electrode uncoated portion may be disposed at an end portion in a length direction of the positive electrode.

The case 20 allows the electrode assembly 10 to be inserted into the opening 21 formed at a side thereof, and has a space for accommodating the electrode assembly 10 and an electrolyte therein. In an embodiment, for example, the case 20 is formed in a cylindrical shape having a lower height H than a diameter D thereof, and has a circular opening 21 such that the cylindrical electrode assembly 10 corresponding to an inner space thereof may be inserted therein.

In the cap assembly 30, the terminal plate 33 includes a flange part 331 and a protruded terminal 332. The flange part 331 is disposed between the cap plate 31 and the electrode assembly 10 to be electrically insulated from and attached to an inner surface of the cap plate 31.

The protruded terminal 332 is protruded outside from the flange part 331 and inserted into a through hole 341 of the thermal fusion member 34 and a terminal hole 311 of the cap plate 31, and an inner surface of the protruded terminal 332 is electrically connected to the second electrode tab 52. The second electrode tab 52 may be connected to an inner surface of the flange part 331 or the inner surface of the protruded terminal 332, or may be connected to both.

In an embodiment, the outer surface of the protruded terminal 332 and the outer surface of the cap plate 31 form a plane and are spaced apart from each other in a diameter direction at a same height based on the bottom of case 20. When assembling the rechargeable battery 1 including this structure into a set, in order to prevent or substantially prevent a reverse direction insertion, the rechargeable battery 1 according to an embodiment further includes a direction determining member 40.

The direction determining member 40 covers the cap plate 31 and is coupled to the case 20 to form an extended part P1. That is, the direction determining member 40 forms a step on a side of the case 20 by the extended part P1.

Therefore, the direction determining member 40 may define both sides of the height direction of the rechargeable battery 1 as an extended part P1 on the upper side and a non-extended part P2 on the lower side. That is, in the rechargeable battery 1, the portion to which the direction determining member 40 is coupled forms an extended part P1, and the portion without the direction determining member 40 forms a non-extended part P2.

In the non-extended part P2, the case 20 and a bottom of the rechargeable battery 1 have a negative property of the first electrode 11, and in the extended part P1, the terminal plate 33 has a positive property of the second electrode 12. In an embodiment, the cap plate 31 coupled to the case 20 has the negative property of the first electrode 11 together with the case 20. That is, the cap plate 31 and the case 20 are electrically connected to each other.

In an embodiment, for example, the direction determining member 40 includes a plane portion 41 and a side portion 42. The plane portion 41 includes a through hole 411 corresponding to the protruded terminal 332 to cover the outer surface of the cap plate 31 while exposing the protruded terminal 332. The side portion 42 extends along the side of the case 20 from an outer surface of the plane portion 41 so as to be coupled to the side of the case 20 by receiving a part of the side of the case 20. In the rechargeable battery 1, the portion to which the direction determining member 40 is coupled forms the extended part P1, and the portion without the direction determining member 40 forms the non-extended part P2.

Therefore, the direction determining member 40 forms a step on the side of the case 20 at a boundary between the extended part P1 and the non-extended part P2 in the height direction and an intersecting direction (diameter direction) orthogonal to the height direction. That is, the extended part P1 relatively increases the height or diameter compared to the non-extended part P2.

In an embodiment, for the case 20, the direction determining member 40 is not coupled at the bottom, such that a first diameter D3 is defined between outer sides of the diameter direction of the case 20. The direction determining member 40 is coupled to the upper part of case 20 and defines a second diameter (same as the diameter D of the battery) between the outside sides of the diameter direction of the direction determining member 40. The second diameter D is larger than the first diameter D3. Therefore, there is a difference in diameter between the upper portion and the lower portion of the rechargeable battery 1.

In an embodiment, the direction determining member 40 may be formed of an electrically insulating material to prevent or substantially prevent an electrical short circuit between an outer surface of the protruded terminal 332 and an outer surface of the cap plate 31. For example, the direction determining member 40 may be formed of polypropylene (PP), polyethylene (PE), polyethylene terephthalate (PET), polyethylene naphthalate (PEN) resin, or rubber. Although not illustrated, synthetic resins or electrical insulation materials may be applied to the direction determining member.

In an embodiment, the through hole 411 of the direction determining member 40 is concentric with the terminal hole 311 of the cap plate 31, and a diameter of the through hole 411 is smaller than a diameter of the terminal hole 311, such that the direction determining member 40 completely covers the outer surface of the cap plate 31 from the side of the protruded terminal 332, thereby effectively preventing an external short circuit due to a conductive material.

In an embodiment, an insulating member 61 disposed on the outer circumference in the diameter direction of the thermal fusion member 34 is installed on the inner surface of the cap plate 31. The insulating member 61 may form an electrically insulating structure between the cap plate 31 and the second electrode tab 52, and between the cap plate 31 and the electrode assembly 10. In an embodiment, the insulating member 61 includes a through hole 611 corresponding to the exterior diameter of the thermal fusion member 34.

In the direction determining member 40, a diameter direction length D1 of the plane portion 41 may be equal to or greater than a length H1 in the height direction of the side portion 42 (D1≥H1). Therefore, the length H1 of the height direction forms a clamping force for the case 20 of the direction determining member 40, and the diameter direction length D1 allows the insulation performance of the terminal plate 31 to be sufficiently secured.

In an embodiment, referring to FIG. 1, in the rechargeable battery 1, in a state that the opening 21 of the case 20 is closed and sealed by the cap assembly 30, the height H is defined as a distance between the case 20 and the outer planes of the direction determining member 40, and the diameter D of the battery is defined as the exterior circumference of the direction determining member 40. In an embodiment, a ratio of the height H to the battery diameter D is 1 or less (H/D≤1). Therefore, the rechargeable battery 1 of an embodiment is a coin-type battery or a button-type battery and may form a thin coin or button shape.

Herein, another embodiment of the present invention is described. Further description of the same configurations as described above may be omitted, and different configurations are described regarding the embodiment shown in FIGS. 4 to 6.

Figure 4:
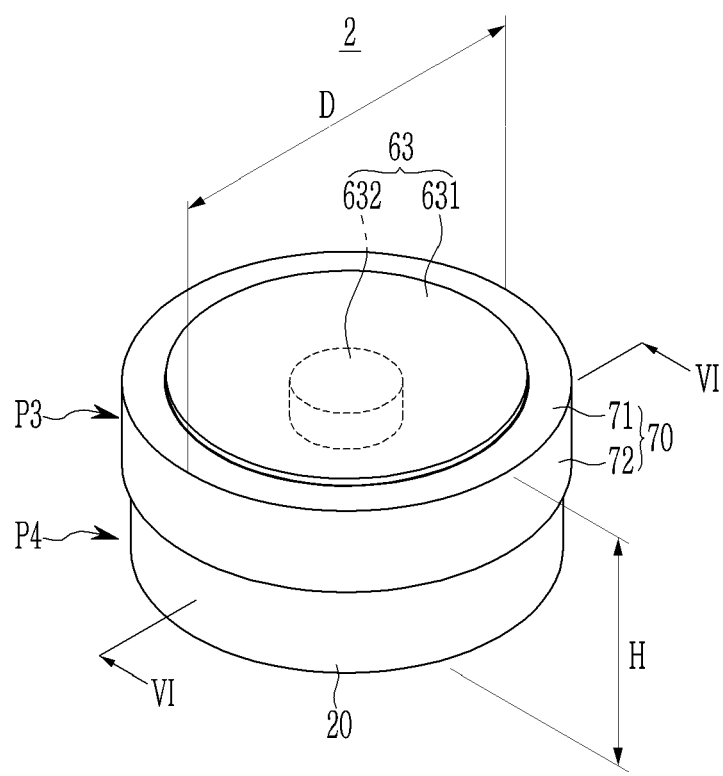
FIG. 4 is a perspective view showing a rechargeable battery according to another embodiment of the present invention.
Figure 5:
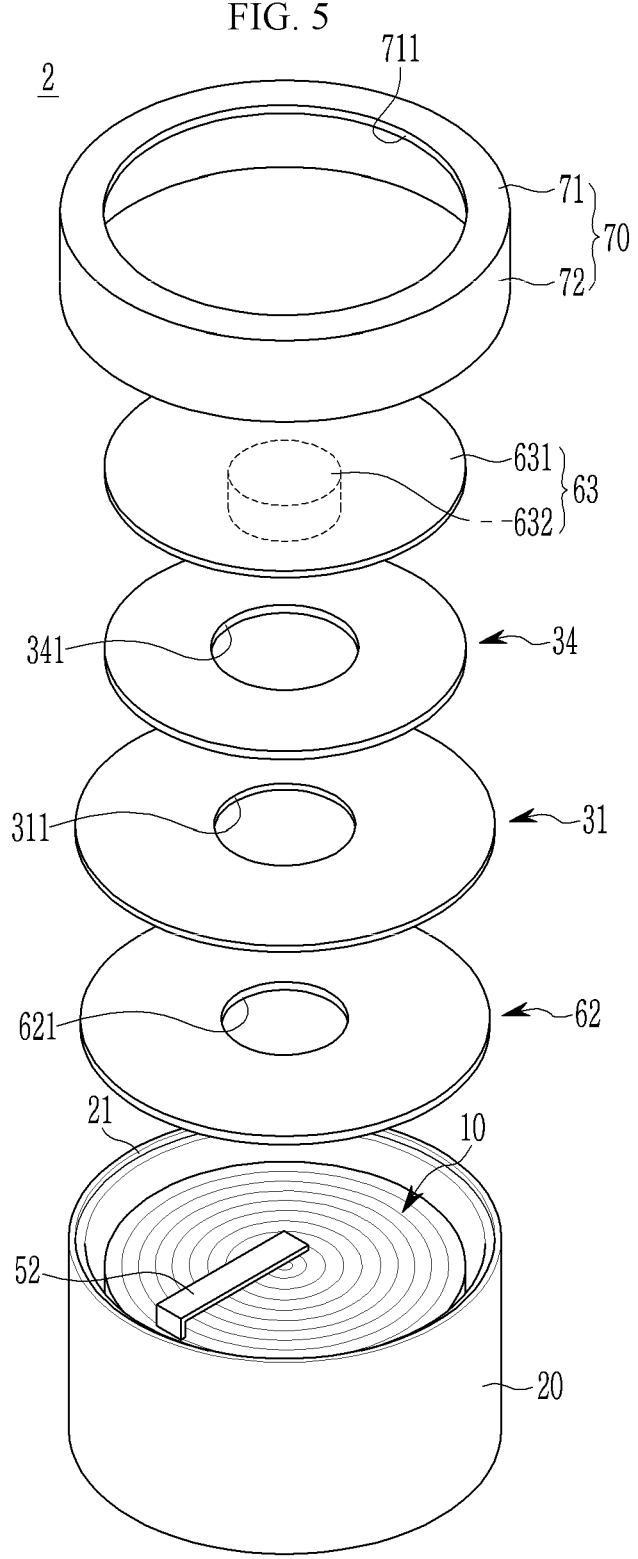
FIG. 5 is an exploded perspective view of the rechargeable battery of FIG. 4.

FIG. 4 is a perspective view showing a rechargeable battery according to another embodiment of the present invention; FIG. 5 is an exploded perspective view of the rechargeable battery of FIG. 4; and FIG. 6 is a cross-sectional view taken along the line VI-VI of FIG. 4.

Figure 6:
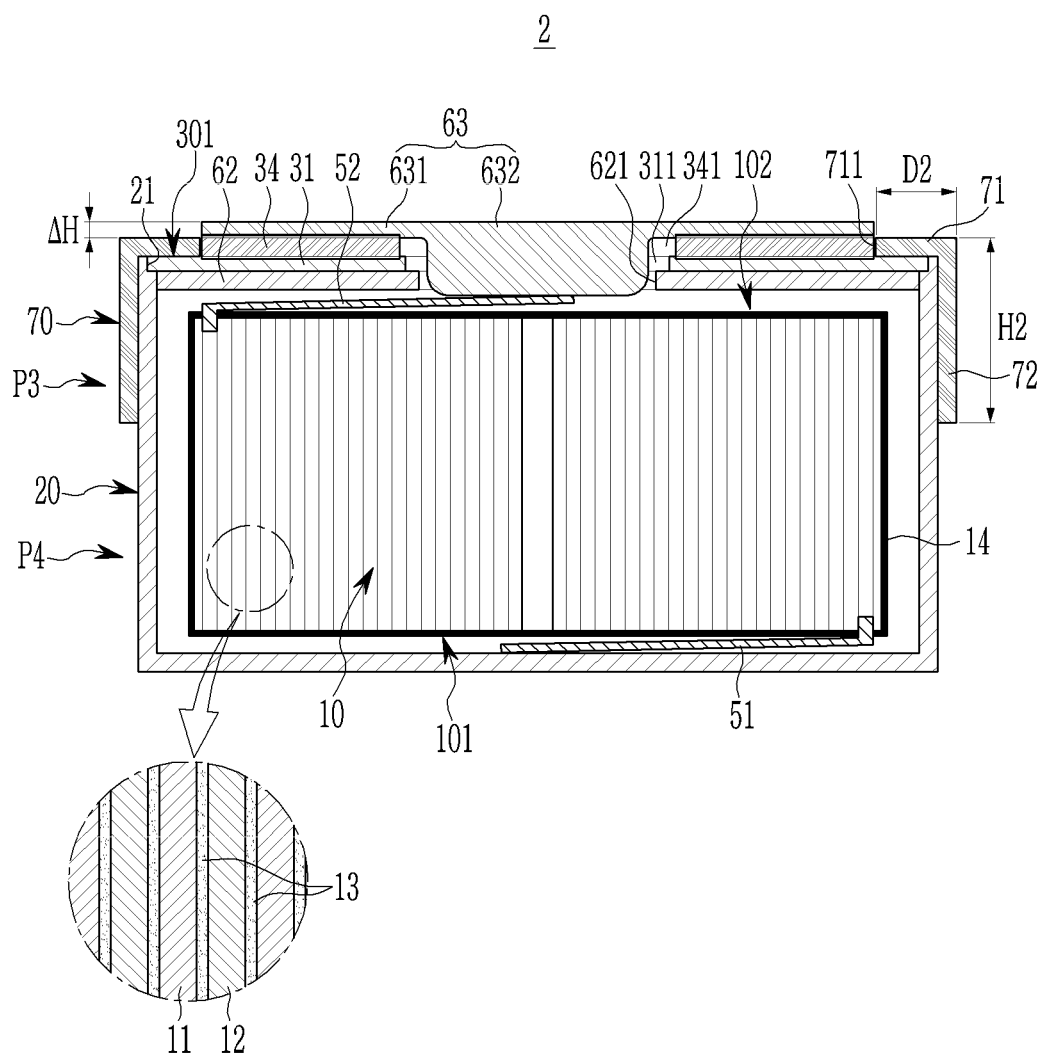
FIG. 6 is a cross-sectional view taken along the line VI-VI of FIG. 4.

Referring to FIG. 4 to FIG. 6, in a rechargeable battery 2 according to another embodiment, in a cap assembly 60, a terminal plate 63 includes a flange part 631 and a tab connection portion 632. The flange part 631 is disposed on the outside of the cap plate 31 and is electrically insulated from and attached to the outer surface of the cap plate 31.

The tab connection portion 632 is protruded inward from the flange part 631 and inserted into the through hole 341 of the thermal fusion member 34 and the terminal hole 311 of the cap plate 31, and the second electrode tab 52 is electrically connected to an inner surface of the tab connection portion 632.

Based on the bottom of the case 20, a part of the outer surface of the cap plate 31 is covered with the flange part 631, and a remaining part of the outer surface (an exposed surface 301) remaining on the outer surface may be formed as a flat surface. To prevent or substantially prevent a reverse direction insertion of the rechargeable battery 2 including this structure, the rechargeable battery 2 according to an embodiment includes a direction determining member 70.

For example, the direction determining member 70 includes a plane portion 71 and a side portion 72. The plane portion 71 includes a through hole 711 corresponding to the flange part 631 so as to cover the exposed surface 301 of the outer surface of the cap plate 31 while exposing the flange part 631 of the terminal plate 63. The side portion 72 extends along the side of the case 20 from an outer surface of the plane portion 71 so as to cover a part of the side of the case 20 and to be coupled to the side of the case 20. In the rechargeable battery 2, a portion to which the direction determining member 70 is coupled defines an extended part P3, and a portion without the direction determining member 70 defines a non-extended part P4.

Therefore, the direction determining member 70 covers the exposed surface 301 of the cap plate 31 and is coupled to the case 20 to form the extended part P3. That is, the direction determining member 70 forms a step on the side of the case 20 by the extended part P3. That is, the extended part P3 relatively increases the height or the diameter compared with the non-extended part P4.

Based on the bottom of the case 20, the height of the plane portion 71 is the height of the flange part 631 or less. Therefore, the plane portion 71 and the flange part 631 may have a height difference ΔH. The height difference ΔH makes it possible to more effectively prevent a reverse direction insertion of the rechargeable battery 2 and to more effectively prevent an external short circuit between the flange part 631 of the terminal plate 63 and the case 20.

In the direction determining member 70, a diameter direction length D2 of the plane portion 71 may be equal to or less than a length H2 in the height direction of the side portion 72 (D2 H2). Therefore, although the diameter direction length D2 may be short, the length H2 in the height direction makes it possible to secure a sufficient fastening force of the direction determining member 70 to the case 20.

In an embodiment, an insulating member 62 disposed on an exterior circumference of the tab connection portion 632 is installed on the inner surface of the cap plate 31. The insulating member 62 may form an electrically insulating structure between the cap plate 31 and the second electrode tab 52, and between the cap plate 31 and the electrode assembly 10.

The insulating member 62 includes a through hole 621 corresponding to the terminal hole 311 of the cap plate 31. The through hole 621 allows the second electrode tab 52 to be connected to the inner surface of the tab connection portion 632. In an embodiment, the through hole 621 has a smaller diameter than that of the terminal hole 311 to prevent or substantially prevent the second electrode tab 52 from being in contact with the cap plate 31.

While the present invention has been described in connection with what are presently considered to be some practical example embodiments, it is to be understood that the invention is not limited to the disclosed embodiments. On the contrary, it is intended to cover various modifications and equivalent arrangements included within the spirit and scope of the appended claims.

What is claimed is:

1. A button cell comprising:
   a case accommodating an electrode assembly and having an opening;
   a cap assembly comprising a cap plate coupled to the case to cover and seal the opening, and a terminal plate coupled to the cap plate; and
   a direction determining member covering the cap plate and coupled to the case to define an extended part,
   wherein the direction determining member comprises:
   a plane portion covering a portion of the cap plate; and
   a side portion extending from the plane portion along a side of the case so as to cover and be adjacent and directly coupled to a part of the side of the case.

2. The button cell of claim 1, wherein
   the electrode assembly comprises a first electrode, a second electrode, and a separator therebetween,
   the case is connected to the first electrode via a first electrode tab, and
   the terminal plate is connected to the second electrode via a second electrode tab.

3. The button cell of claim 2, wherein
   the cap plate is electrically connected to the case, and
   the cap plate and the terminal plate are thermally fused with a thermal fusion member therebetween and are electrically insulated from each other.

4. The button cell of claim 2, wherein the terminal plate comprises:
   a flange part between the cap plate and the electrode assembly and electrically insulated from and attached to an inner surface of the cap plate; and
   a protruded terminal protruded outside from the flange part to be inserted into a terminal hole of the cap plate and electrically connected to the second electrode tab via an inner surface of the terminal plate.

5. The button cell of claim 4, wherein an outer surface of the protruded terminal and an outer surface of the cap plate define a plane surface and are separated from each other at a same height based on a bottom of the case.

6. The button cell of claim 5, wherein
   the plane portion comprises a through hole corresponding to the protruded terminal so as to cover the outer surface of the cap plate while exposing the protruded terminal, and the side portion extends along the side of the case from an outer surface of the plane portion.

7. The button cell of claim 6, wherein the direction determining member comprises an electrically insulating material to electrically insulate between the outer surface of the protruded terminal and the outer surface of the cap plate.

8. The button cell of claim 7, wherein
the through hole of the direction determining member is concentric with the terminal hole of the cap plate, and
a diameter of the through hole is smaller than a diameter of the terminal hole, thereby covering an entire outer surface of the cap plate at a side of the protruded terminal.

9. The button cell of claim 7, wherein the direction determining member comprises polypropylene, polyethylene, polyethylene terephthalate, polyethylene naphthalate, resin, or rubber.

10. The button cell of claim 6, wherein a diameter direction length of the plane portion is equal to or greater than a length in a height direction of the side portion.

11. The button cell of claim 2, wherein the terminal plate comprises:
a flange part outside the cap plate and electrically insulated from and attached to an outer surface of the cap plate; and
a tab connection portion protruded inside from the flange part to be inserted into a terminal hole of the cap plate and electrically connected to the second electrode tab via an inner surface of the terminal plate.

12. The button cell of claim 11, wherein, based on a bottom of the case, the outer surface of the cap plate is covered by the flange part, and a remaining exposed surface of the cap plate defines a plane surface.

13. The button cell of claim 12, wherein
the plane portion comprises a through hole corresponding to the flange part so as to cover the exposed surface of the cap plate while exposing the flange part, and
the side portion extends along the side of the case outside the plane portion.

14. A button cell comprising:
a case accommodating an electrode assembly and having an opening;
a cap assembly comprising a cap plate coupled to the case to cover the opening, and a terminal plate coupled to the cap plate; and
a direction determining member covering the cap plate and coupled to the case to define an extended part,
wherein the electrode assembly comprises a first electrode, a second electrode, and a separator therebetween,
the case is connected to the first electrode via a first electrode tab, and
the terminal plate is connected to the second electrode via a second electrode tab,
wherein the terminal plate comprises:
a flange part outside the cap plate and electrically insulated from and attached to an outer surface of the cap plate; and
a tab connection portion protruded inside from the flange part to be inserted into a terminal hole of the cap plate and electrically connected to the second electrode tab via an inner surface of the terminal plate,
wherein, based on a bottom of the case, the outer surface of the cap plate is covered by the flange part, and a remaining exposed surface of the cap plate defines a plane surface,
wherein the direction determining member comprises:
a plane portion comprising a through hole corresponding to the flange part so as to cover the exposed surface of the cap plate while exposing the flange part; and
a side portion extending along a side of the case outside the plane portion so as to cover and be coupled to a part of the side of the case, and
wherein, based on the bottom of the case, a height of the plane portion is equal to or less than a height of the flange part.

15. The button cell of claim 13, wherein a diameter direction length of the plane portion is equal to or less than a length in a height direction of the side portion.

16. The button cell of claim 13, further comprising an insulating member on an exterior circumference of the tab connection portion and arranged at an inner surface of the cap plate.

17. The button cell of claim 1, wherein the direction determining member defines a step on a side of the case by the extended part.

18. The button cell of claim 1, wherein
the case defines a first diameter at an outer surface in a diameter direction at a lower portion, and
the direction determining member is coupled to an upper portion of the case to define a second diameter that is larger than the first diameter in the diameter direction.

* * * * *